United States Patent [19]

Liang

[11] Patent Number: 5,895,570
[45] Date of Patent: Apr. 20, 1999

[54] MODULAR FILTERING SYSTEM

[75] Inventor: Li-Shiang Liang, Harvard, Mass.

[73] Assignee: United States Filter Corporation, Palm Desert, Calif.

[21] Appl. No.: 08/599,259

[22] Filed: Feb. 9, 1996

[51] Int. Cl.$^6$ .................................................. B01D 25/02
[52] U.S. Cl. ........................................ 210/232; 210/284
[58] Field of Search .................................. 210/252, 282, 210/284, 335, 336, 232, 288, 542

[56] References Cited

U.S. PATENT DOCUMENTS

| | | | |
|---|---|---|---|
| 526,695 | 10/1894 | Emery . | |
| 844,438 | 2/1907 | Bayley | 210/341 |
| 1,942,584 | 1/1934 | Weinstein | 210/132 |
| 2,278,488 | 4/1942 | Ralston | 210/282 |
| 2,391,716 | 12/1945 | Koupal | 210/130 |
| 2,525,497 | 10/1950 | Monfried | 206/46 |
| 2,752,309 | 6/1956 | Emmons et al. | 210/24 |
| 2,809,753 | 10/1957 | Atkinson | 210/301 |
| 3,155,612 | 11/1964 | Weber | 210/291 |
| 3,171,801 | 3/1965 | Rice et al. | 210/52 |

(List continued on next page.)

FOREIGN PATENT DOCUMENTS

| | | |
|---|---|---|
| 982779 | 2/1976 | Canada . |
| 296 043 | 12/1988 | European Pat. Off. . |
| 0 509 332 | 10/1992 | European Pat. Off. . |
| 0 598 249 | 5/1994 | European Pat. Off. . |
| 2.216.230 | 2/1974 | France . |
| 19 33 745 | 1/1971 | Germany . |
| 20 53 551 | 5/1972 | Germany . |
| 2 355 178 | 5/1974 | Germany . |
| 25 55 178 | 6/1977 | Germany . |
| WO 93/00976 | 1/1993 | WIPO . |

OTHER PUBLICATIONS

International Search Report, dated Jun. 23, 1997, for PCT/US97/01724.

Enviro–Systems Corp. (Los Angeles, CA); ESC Brochure with Distributor & OEM Product List.

Ionics, Incorporated (Bridgeville, PA); General Ionics® Reverse Osmosis/Activated Carbon Drinking Water Appliance—Advertisement—G.I. Series Drinking Water System™.

PURA, Inc. (Valencia, CA) PURA® Ultraviolet Plus Complete Household Water Treatment Systems with Flow Rates of 10 GPM—Advertisement.

PURA, Inc. (Valencia, CA); PURA® Ultra Violet Plus Point of Use of Water Treatment Systems with Flow Rates of 2 GPM—Advertisement.

Triangle Distributors Ltd. (Victoria, BC, Canada) H$_2$O Heads Up® Shower Filter—Advertisement.

Americlean Reverse Osmosis System—Advertisement.

Marlo, Inc. (Racine, WI) Marlo RO–14C Reverse Osmosis Drinking Water System—Advertisement.

Microline (Windsor, WI); Microline® Reverse Osmosis Systems for the World's Water, T.F.C.–35DF Reverse Osmosis System—Advertisement.

*Primary Examiner*—Ivars Cintins
*Attorney, Agent, or Firm*—Wolf, Greenfield & Sacks, P.C.

[57] ABSTRACT

A modular filtering system is provided including modular filter cartridges which can be arranged into filter assemblies of various configurations by interconnecting the filter cartridges in a desired configuration. In one embodiment of the invention, the modular filtering system includes a first filter cartridge, a second filter cartridge and a connector clip that mechanically secures the first filter cartridge to the second filter cartridge. The first filter cartridge includes an outlet port which is hydraulically connected to an input port on the second filter cartridge. Each filter cartridge includes a filter tube, a first end cap attached to one end of the filter tube and a second end cap that is attached to an opposite end of the filter tube. The connector clip can be connected between the first end caps of the filter cartridges, the second end caps of the filter cartridges, or both the first and second end caps of the filter cartridges. The connector clip can include a locking tab and each end cap can include a socket connector that is adapted receive the locking tab of the connector clip. The end caps can also include a plurality of planar portions arranged in an axially symmetric pattern around the side wall of the end caps. The inlet and outlet ports and the socket connector are disposed on the end caps at a planar portion.

17 Claims, 7 Drawing Sheets

U.S. PATENT DOCUMENTS

| | | | |
|---|---|---|---|
| 3,252,899 | 5/1966 | Rice et al. | 210/40 |
| 3,266,628 | 8/1966 | Price | 210/288 |
| 3,382,169 | 5/1968 | Thompson | 210/32 |
| 3,396,847 | 8/1968 | Englesberg | 210/85 |
| 3,456,413 | 7/1969 | Fischer | 52/591 |
| 3,497,069 | 2/1970 | Lindenthal et al. | 210/282 |
| 3,554,377 | 1/1971 | Miller | 210/275 |
| 3,716,143 | 2/1973 | Clark | 210/321 |
| 3,753,495 | 8/1973 | Bjork | 210/206 |
| 3,756,413 | 9/1973 | Gartner | 210/205 |
| 3,855,133 | 12/1974 | Roehsler | 210/490 |
| 3,909,402 | 9/1975 | Gartner | 210/27 |
| 3,914,176 | 10/1975 | Holmes | 210/132 |
| 3,950,253 | 4/1976 | Stern | 210/282 |
| 3,977,967 | 8/1976 | Trulson et al. | 210/23 |
| 3,985,648 | 10/1976 | Casolo | 210/38 B |
| 4,033,874 | 7/1977 | Marquardt et al. | 210/189 |
| 4,039,444 | 8/1977 | Bory et al. | 210/36 |
| 4,088,563 | 5/1978 | Marquardt | 210/33 |
| 4,105,562 | 8/1978 | Kaplan et al. | 210/232 |
| 4,118,317 | 10/1978 | Neeb et al. | 210/32 |
| 4,133,754 | 1/1979 | Bory et al. | 210/36 |
| 4,154,704 | 5/1979 | Vinton et al. | 252/444 |
| 4,160,738 | 7/1979 | Guter | 210/232 |
| 4,161,445 | 7/1979 | Coillet | 210/23 H |
| 4,182,676 | 1/1980 | Casolo | 210/27 |
| 4,184,893 | 1/1980 | Halvorson et al. | 134/25 R |
| 4,191,648 | 3/1980 | Kaplan et al. | 210/186 |
| 4,192,750 | 3/1980 | Elfes et al. | 210/133 |
| 4,196,081 | 4/1980 | Pavia | 210/94 |
| 4,233,158 | 11/1980 | Wachsmuth | 210/283 |
| 4,280,912 | 7/1981 | Berry, III et al. | 210/662 |
| 4,343,707 | 8/1982 | Lucas | 210/695 |
| 4,347,136 | 8/1982 | Friesen et al. | 210/253 |
| 4,367,150 | 1/1983 | Hiesinger et al. | 210/777 |
| 4,368,123 | 1/1983 | Stanley | 210/289 |
| 4,411,785 | 10/1983 | Yu et al. | 210/321.1 |
| 4,414,113 | 11/1983 | LaTerra | 210/636 |
| 4,430,226 | 2/1984 | Hegde et al. | 210/638 |
| 4,451,369 | 5/1984 | Sekino et al. | 210/321.1 |
| 4,522,717 | 6/1985 | Brust | 210/238 |
| 4,541,926 | 9/1985 | Stanley | 210/87 |
| 4,609,466 | 9/1986 | McCausland et al. | 210/244 |
| 4,615,800 | 10/1986 | Stifelman et al. | 210/132 |
| 4,636,307 | 1/1987 | Inoue et al. | 210/188 |
| 4,645,605 | 2/1987 | Durham | 210/679 |
| 4,647,375 | 3/1987 | Czeller et al. | 210/267 |
| 4,659,460 | 4/1987 | Muller et al. | 210/93 |
| 4,681,677 | 7/1987 | Kuh et al. | 210/88 |
| 4,701,258 | 10/1987 | Billiet et al. | 210/542 |
| 4,786,420 | 11/1988 | Dalessandro | 210/791 |
| 4,818,398 | 4/1989 | Lott et al. | 210/238 |
| 4,826,594 | 5/1989 | Sedman | 210/266 |
| 4,855,046 | 8/1989 | Meehan | 210/284 |
| 4,894,154 | 1/1990 | Roz et al. | 210/266 |
| 4,944,875 | 7/1990 | Gaignet | 210/232 |
| 4,948,505 | 8/1990 | Petrucci et al. | 210/238 |
| 5,128,035 | 7/1992 | Clack et al. | 210/251 |
| 5,143,601 | 9/1992 | Slovak et al. | 210/90 |
| 5,277,807 | 1/1994 | Lavoie et al. | 210/321 |
| 5,354,464 | 10/1994 | Slovak et al. | 210/240 |
| 5,397,468 | 3/1995 | Chomka et al. | 210/232 |
| 5,399,263 | 3/1995 | Chomka et al. | 210/257.1 |
| 5,401,399 | 3/1995 | Magnusson et al. | 210/136 |
| 5,407,571 | 4/1995 | Rothwell | 210/232 |
| 5,487,832 | 1/1996 | De Souza | 210/232 |
| 5,552,043 | 9/1996 | Noordhoff | 210/284 |

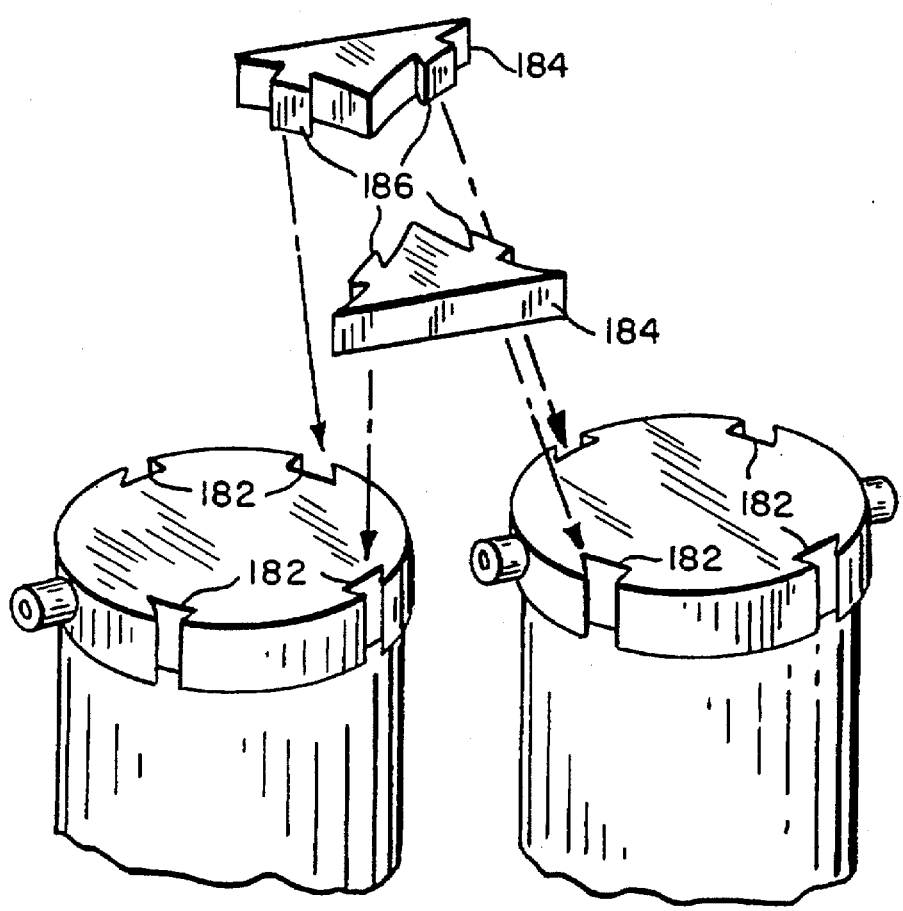
FIG. 17
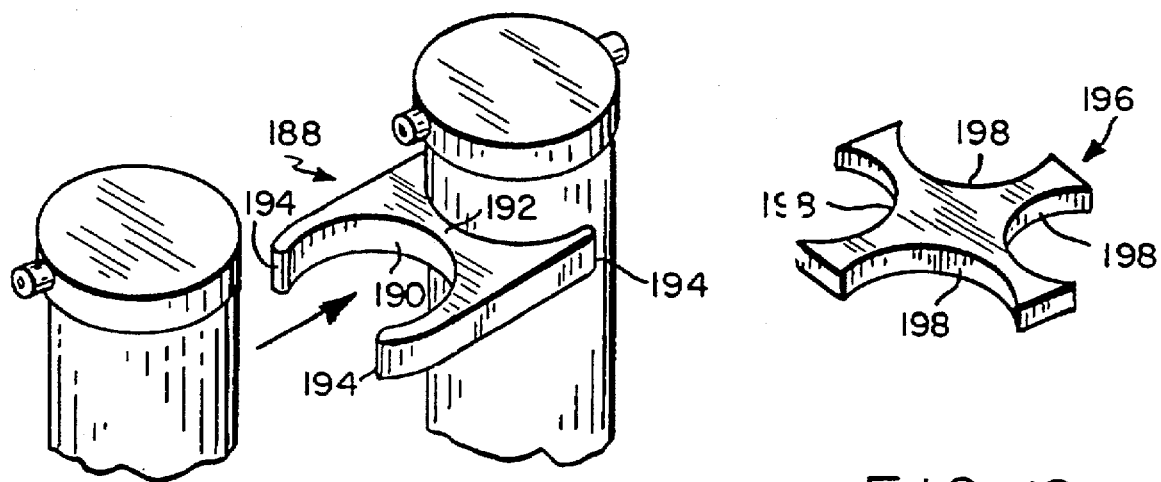
FIG. 18
FIG. 19

MODULAR FILTERING SYSTEM

BACKGROUND OF THE INVENTION

1. Field of the Invention

The present invention relates to a fluid filtering system. More particularly, the present invention relates to a modular filter cartridge which can be arranged into filter assemblies of various configurations by hydraulically and mechanically interconnecting a plurality of individual filter cartridges.

2. Description of the Related Art

The use of fluid filtering systems continues to expand into an ever increasing number of areas. For example, fluid filtering systems are used in research, medical, commercial, industrial, and even residential applications to treat fluids conventionally associated with such facilities. In particular, the treatment of water is one area in which the need for improved filtering systems continues to grow as the demand increases for cleaner, more pure water in homes as well as research laboratories, and the quality of municipal water supplies continues to deteriorate in many regions throughout the world. In addition to water, other fluids such as oil, bodily fluids, and the like also require treatment in many instances to remove unwanted contaminants, odors, bacteria, and the like.

The sequential treatment of fluids through multiple filters is known to have an affect on the quality of the filtered fluid as it passes through a filtering system. Both the number of filters and the type of filter media contained in the filters can affect the amount and type of contaminants removed from a treated fluid. Accordingly, it is desirable to provide a filtering system in which the number of individual filter cartridges, the type of filter media and the particular configuration of the filtering system can be readily assembled.

Filtering systems are known which include individual filter cartridges that are hydraulically connected to each other to form a filtering system. However, many of these filtering systems suffer from a variety of disadvantages. For example, many modular filtering systems hydraulically interconnect individual filter cartridges using threaded hydraulic fittings and tubing. In addition to providing the hydraulic circuit, the fittings and tubing may also provide the only mechanical support between the individual filter cartridges. Such systems are more prone to fluid leaks due to internal pressure or external forces placed on the filtering system. Furthermore, in such systems, modification of the particular filtering configuration or replacement of individual filter cartridges can be difficult, labor intensive tasks. An example of a filtering system using hydraulic fittings is disclosed by Dalessandro, in U.S. Pat. No. 4,786,420.

In an effort to overcome some of the foregoing disadvantages, filtering systems have been developed that eliminate such hydraulic fittings and tubing by using a fluid manifold that interconnects the individual filter cartridges. In general, the manifold of these systems is formed with fluid passages that hydraulically connect the filter cartridges in a desired configuration. However, such manifolds are typically made for a particular application and cannot be reconfigured once the internal flow passages are formed. Examples of filtering systems using manifolds are disclosed by Clack et al., in U.S. Pat. No. 5,128,035, and Slovak et al., in U.S. Pat. No. 5,143,601.

Another example of a water filter apparatus using multiple filter tubes in a sequential arrangement is disclosed by Gaignet, in U.S. Pat. No. 4,944,875. The apparatus includes a plurality of filter tubes which are connected both structurally and hydraulically by two molded end plates. The desired flow path is established by modifying the end plates prior to assembly to provide appropriate holes through internal partitions. The end plates are then permanently bonded to the ends of the tubes either thermally or adhesively. A major disadvantage of this apparatus is the inability to reconfigure the apparatus or replace filter tubes once the end plates are bonded to the tubes.

Accordingly, it is desirable to provide a fluid filtering system that includes a plurality of modular filter cartridges that can be readily connected and disconnected from each other to form a fluid circuit in a desired configuration.

SUMMARY OF THE INVENTION

In accordance with the foregoing, the invention provides a modular filtering system and method of assembly that uses individual filter cartridges that can be arranged in various configurations.

According to one aspect of the invention, a modular filtering system includes a first filter cartridge, a second filter cartridge and a connector clip that mechanically secures the first filter cartridge to the second filter cartridge. The first filter cartridge includes an outlet port which is hydraulically connected to an inlet port on the second filter cartridge.

According to another aspect of the invention, a method for assembling a modular filtering system using a plurality of individual filter cartridges includes providing a first filter cartridge, a second filter cartridge and a connector clip. An outlet port of the first filter cartridge is hydraulically connected to an inlet port of the second filter cartridge. The connector clip is attached to the first filter cartridge and the second filter cartridge to mechanically secure the first filter cartridge to the second filter cartridge.

According to another aspect of the invention, a clip for a modular filter cartridge comprises a body that includes a side wall adapted to conform to a shape of the modular filter cartridge, and a locking tab that protrudes from the side wall of the body. The locking tab is adapted to be inserted into a corresponding socket in the modular filter cartridge.

According to a further aspect of the invention, an end cap for a modular filter cartridge includes a body adapted to be attached to an end of a filter tube, an inlet port and an outlet port. The inlet and outlet ports are disposed on a side wall of the body. The side wall includes a plurality of axially symmetrical planar portions, wherein and the inlet and outlet ports are disposed on planar portions of the side wall.

BRIEF DESCRIPTION OF THE DRAWINGS

It is to be understood that the drawings are for the purpose of illustration only and are not intended as a definition of the limits of the invention. The foregoing and other objects and advantages of the present invention will become apparent with reference to the following detailed description when taken in conjunction with the following drawings, wherein the same reference numbers identify the same feature, in which:

FIG. 17 is a partial perspective view of a further illustrative embodiment of a side clip and a dovetail arrangement;

FIG. 18 is a partial perspective view of a tube clip for securing two filter cartridges;

FIG. 19 is a partial perspective view of a tube clip for securing four filter cartridges;

DETAILED DESCRIPTION OF THE INVENTION

The present invention is directed to a modular filter cartridge which can be arranged into filter assemblies of various configurations by interconnecting a plurality of filter cartridges in a desired configuration.

Figure 1:
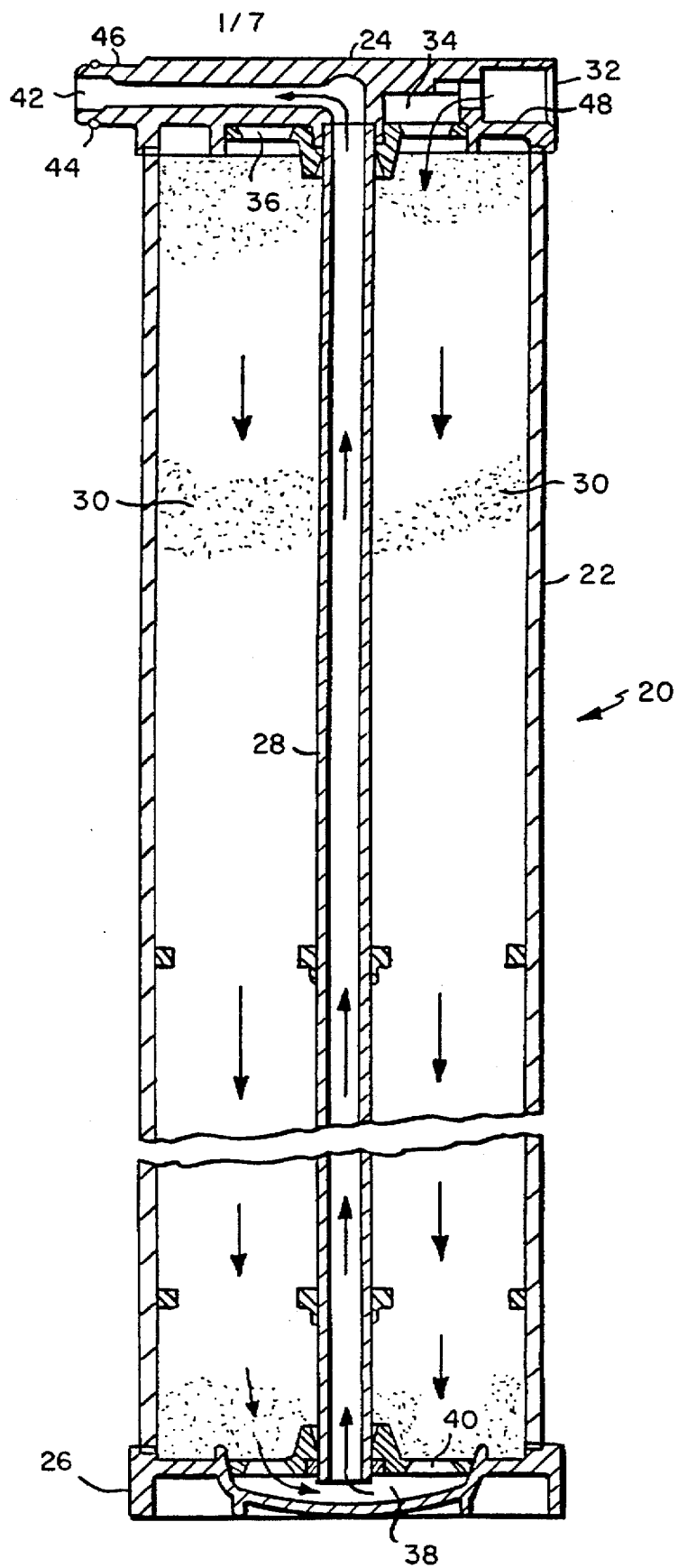
FIG. 1 is a side elevational cross-sectional view of an illustrative embodiment of a modular filter cartridge of the present invention.

FIG. 1 is a side elevational cross-sectional view of an illustrative embodiment of a modular filter cartridge 20 of the present invention. The filter cartridge 20 includes an outer tube 22, a top end cap 24, a bottom end cap 26 and a return tube 28. The top and bottom end caps 24, 26 are attached to opposite ends of the tube 22 with the return tube 28 extending between and being connected to the top and bottom end caps. The tube 22 is filled with a filtering media 30 (e.g., activated carbon) which surrounds the return tube 28 and is retained within the tube by the top and bottom end caps 24, 26.

A fluid (e.g., water), which is to be treated, enters the filter cartridge 20 through an inlet port 32 and an inlet plenum 34 located in the top end cap 24. The fluid is directed into the tube 22 through an upper flow distributer 36 in the top end cap 24 which uniformly distributes the fluid into the tube 22. The fluid permeates down through the filtering media 30 to the bottom of the tube 22 where it passes through a lower flow distributor 40 and collects in an outlet plenum 38 in the bottom end cap 26. The fluid is directed upwardly from the outlet plenum 38 through the return tube 28 into the top end cap 24 from which the fluid is discharged through an outlet port 42.

As shown in FIG. 1, the inlet port 32 is a female socket which is adapted to receive a male outlet port similar to the illustrated outlet port 42. A hydraulic connection between modular filter cartridges 20 is achieved by inserting the male outlet port 42 of one filter cartridge into the female inlet port 32 of another filter cartridge. A hydraulic seal which prevents the leakage of fluid between the inlet and outlet ports is established with an O-ring 44 disposed on the exterior of the outlet port 42. The O-ring 44 is compressed between the outer wall 46 of the outlet port 42 and the inner wall 48 of the input port 32, thereby creating a sealed interface between the outlet port 42 and the inlet port 32 to prevent leakage. The O-ring 44 should be sufficiently compressed to maintain a hydraulic seal between the ports which can withstand the anticipated hydraulic pressures placed on the cartridges. It is to be appreciated that the inlet and outlet ports can be configured in various combinations of male and female ports. The construction and fluid flow scheme of the filter cartridge are more specifically described in co-pending U.S. patent application Ser. No. 08/598,818, entitled "Water Purification Cartridge Assembly with Unidirectional Flow Through Filter Media", filed concurrently with this application on Feb. 9, 1996, and such disclosure is incorporated herein by reference.

By hydraulically interconnecting a plurality of individual modular filter cartridges 20 to each other, a filter assembly can be configured and assembled for various applications. One can hydraulically connect a plurality of individual filter cartridges 20 in series so that each filter cartridge 20 sequentially filters the fluid to remove the same or different type contaminants. For example, the filtering media 30 in each of the individual filter cartridges 20 can vary from cartridge to cartridge, wherein each type media is effective in removing a different contaminant in each of the individual cartridges.

Figure 2:
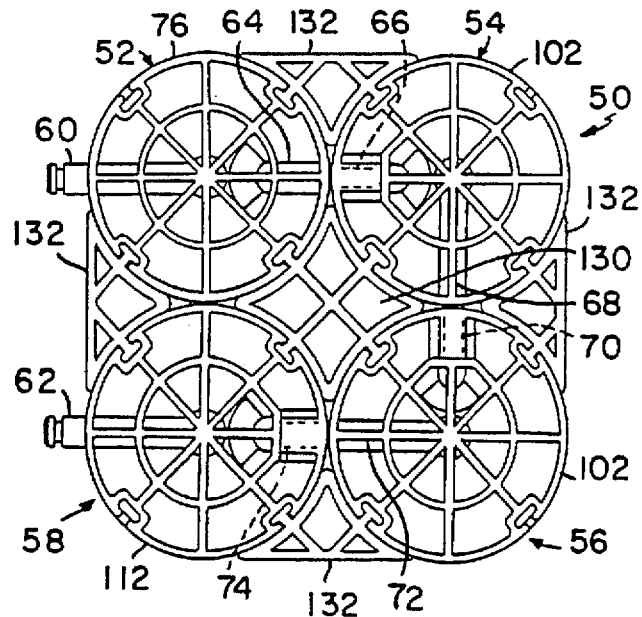
FIG. 2 is a top plan view of an illustrative embodiment of four filter cartridges arranged in a U-shaped configuration.
Figure 3:
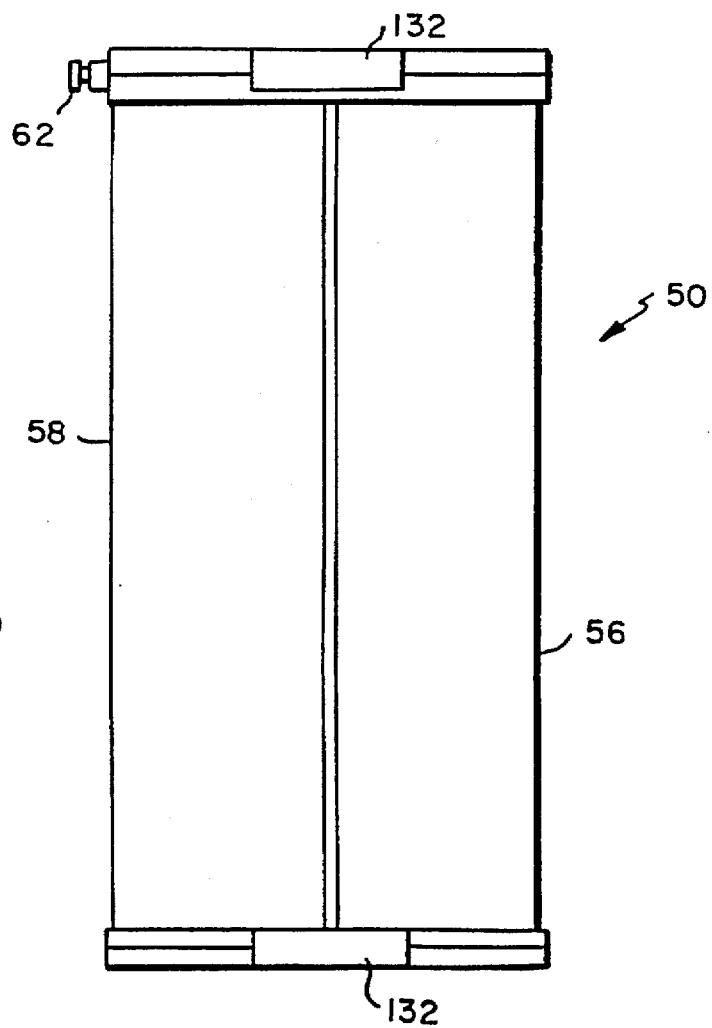
FIG. 3 is a side elevational view of the filter assembly shown in FIG. 2.

One embodiment of a filter assembly 50 utilizing a combination of individual filter cartridges is shown in FIGS. 2 and 3 arranged in a U-shaped configuration. The filter assembly 50 includes four filter cartridges hydraulically connected in series to achieve a flow through each filter cartridge as described above. In particular, the U-shaped filter assembly 50 includes a first filter cartridge 52, a second filter cartridge 54, a third filter cartridge 56 and a fourth filter cartridge 58. Each of the filter cartridges is hydraulically connected to another of the filter cartridges such that fluid which enters the unit through inlet port 60 sequentially flows through each cartridge as described above and is discharged from the outlet port 62 of the fourth filter cartridge 58. This particular arrangement is referred to as a U-shaped configuration because, when viewed from the top, the flow circuit turns 180° through the assembly such that the inlet port 60 and outlet port 62 are located on the same side of the filter assembly 50. This is advantageous so that the assembly can be easily mounted on a console (not shown).

As shown in FIG. 2, the top end caps of each filter cartridge are hydraulically connected in the following manner to establish a flow circuit. Fluid to be treated enters the first filter cartridge 52 through the inlet port 60. The fluid is discharged from the first filter cartridge 52 through its outlet port 64 which is hydraulically connected to the inlet port 66 of the second cartridge 54. The fluid then flows through the second cartridge 54 and is discharged through its outlet port 68 which is hydraulically connected to the inlet port 70 of the third filter cartridge 56. Likewise, the outlet port 72 of the third cartridge 56 is hydraulically connected to the inlet port 74 of the fourth cartridge 58 so that fluid discharged from the third cartridge 56 enters the fourth cartridge 58. The fluid is subsequently discharged from the filter assembly 50 through the outlet port 62 of the fourth cartridge 58.

The U-shaped configuration of the filter assembly 50 shown in FIG. 2 is achieved using top end caps having various configurations of inlet and outlet ports which can be selectively attached to filter cartridge tubes to achieve a desired arrangement of filter cartridges. In the illustrative embodiment shown in FIG. 2, three variations for a top end cap are utilized on a filter cartridge to achieve this particular U-shaped configuration.

Figure 4:
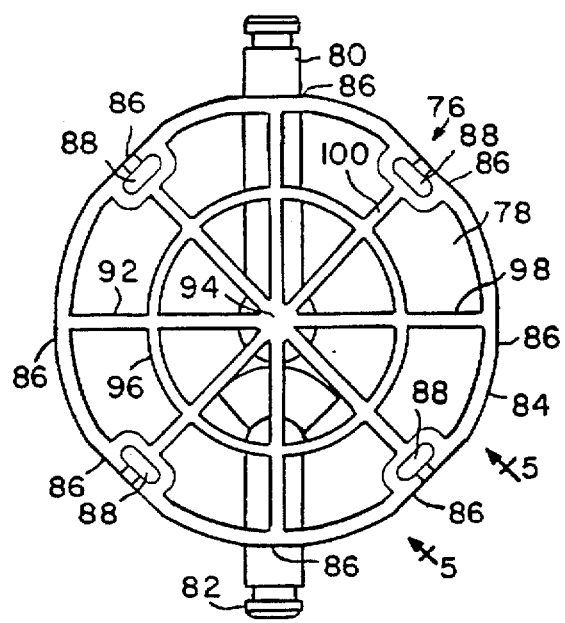
FIG. 4 is a top plan view of an illustrative embodiment of a top end cap, including a straight male-to-male hydraulic port configuration and mechanical interconnection features of the present invention.

The first filter cartridge 52 uses a straight male-to-male top end cap 76 which includes a male inlet axially aligned with a male outlet. As shown in FIG. 4, the straight male-to-male top end cap 76 includes a circular body 78, a male inlet port 80 and a male outlet port 82. The inlet and outlet ports 80, 82 protrude from the side wall 84 of the body 78 approximately 180° apart from each other. The side wall 84, while generally circular, includes a plurality of planar portions 86 spaced approximately 45° apart from each other in an axially symmetric arrangement along the periphery of the side wall 84. In particular, the inlet and outlet ports 80, 82 are each located so as to protrude from a planar portion 86 of the side wall 84. The planar portions 86 ensure that a male outlet port 82 can be fully inserted into a corresponding female inlet port when adjacent filter cartridges are hydraulically connected to each other. The planar portions 86 also increase the contact surface area between adjacent filter cartridges which can reduce the potential rocking motion between adjacent cartridges thereby ensuring a more reliable hydraulic connection.

Figure 5:
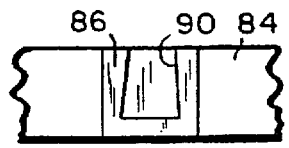
FIG. 5 is a partial side elevational view taken along view line 5—5 of FIG. 4.

The end cap 76 also includes four T-shaped sockets 88 spaced approximately 90° apart from each other in an axially symmetric manner inboard the side wall 84 and offset approximately 45° from the inlet and outlet ports 80, 82. Each of the sockets 88 is also disposed at a planar portion 86 of the side wall 84 to ensure a tight mechanical connection can be achieved between adjacent filter cartridges when mechanically connected together as discussed more fully below. As best shown in FIG. 5, each socket 88 has a dovetail-shaped slot 90 extending axially along the planar portion 86 of the side wall 84 for receiving a corresponding T-shaped tab on a connector clip as described below. The dovetail shape of the slot 90 produces a gripping force on the connector clip when it is inserted in the socket 88 to help retain the clip in the socket.

The top end cap 76 also includes a plurality of interconnected ribs to reduce the deflection of the side wall 84 and sockets 88 when adjacent filter cartridges are connected to each other. Eight inner radial ribs 92 extend from a central hub portion 94 outwardly to an inner circular wall 96. Four outer radial ribs 98 interconnect the inner circular wall 96 to the side wall 84 at the planar portions 86. Similarly, four outer radial ribs 100 interconnect the inner circular wall to the sockets 88.

Figure 6:
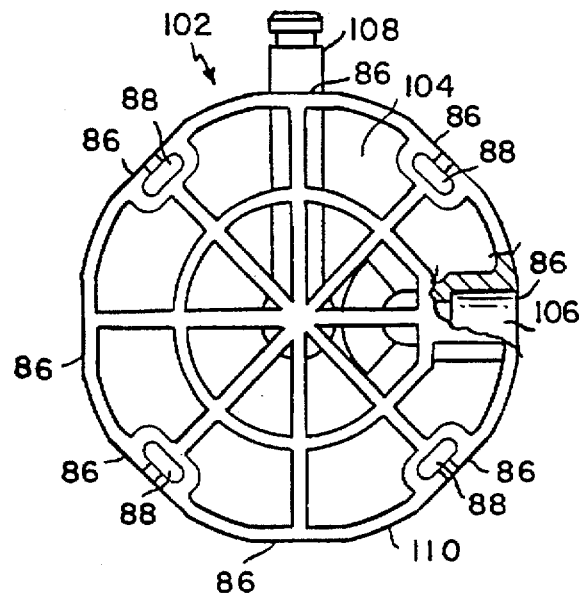
FIG. 6 is a top plan view of another illustrative embodiment of a top end cap, including an angled female-to-male hydraulic port configuration, wherein the female port is shown in a partial cut-away view.

An angled top end cap 102 is used on the second and third filter cartridges 54, 56 in the filter assembly 50 illustrated in FIG. 2 so that the flow circuit can be turned 180°. As shown in FIG. 6, the angled top end cap 102 includes features similar to the straight male-to-male top end cap 76 described above. However, the distinction lies in the particular inlet port and outlet port configuration. The angled top end cap 102 includes a body 104, a female inlet port 106 and a male outlet port 108 spaced approximately 90° from the inlet port 106 along the side wall 110 of the end cap. The angled top end cap 102 also includes the axially symmetric planar portions 86 and T-shaped sockets 88 described above.

Figure 7:
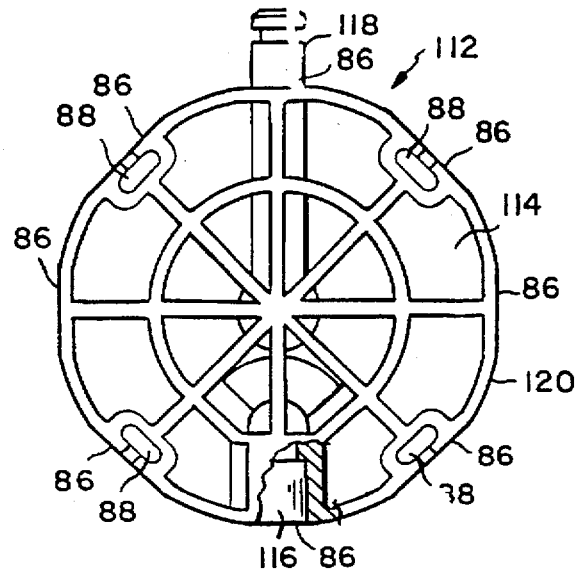
FIG. 7 is a top plan view of a further illustrative embodiment of a top end cap, including a straight female-to-male hydraulic port configuration, wherein the female port is shown in a partial cut-away view.

A straight top end cap 112 is used on the fourth filter cartridge 58 of the filter assembly 50 illustrated in FIG. 2. As shown in FIG. 7, the female-to-male top end cap 112 includes features similar to the male-to-male and angled top end caps 76, 102 described above. The female-to-male top end cap 112 includes a body 114, a female inlet port 116 and a male outlet port 118, wherein the inlet and outlet ports 116, 118 are axially aligned approximately 180° apart along the side wall 120 in a manner similar to the male-to-male top end cap 76. The female-to-male top end cap 112 also includes the axially symmetric planar portions 86 and T-shaped sockets 88 described above.

Figure 8:
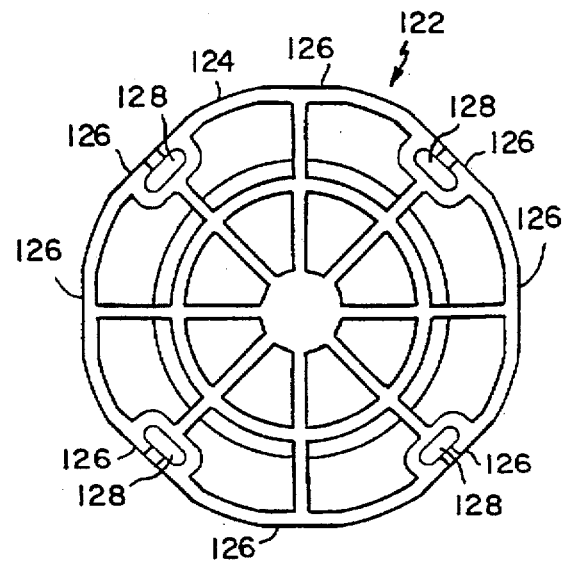
FIG. 8 is a bottom plan view of an illustrative embodiment of a bottom end cap illustrating mechanical interconnection features of the present invention.

FIG. 8 illustrates an embodiment of a bottom end cap which can be used with any of the filter cartridges of the filter assembly 50 shown in FIG. 2. As shown in FIG. 8, the bottom end cap 122 is very similar structurally to each of the top end caps with the exception that it does not include either an inlet or outlet port. The bottom end cap 122 is a circular-shaped member that includes a side wall 124 having a plurality of planar portions 126 spaced approximately 45° apart in an axially symmetric arrangement along the periphery of the side wall 124. As discussed above in connection with the top end caps, the planar portions 126 provide a larger contact surface between adjacent filter cartridges which enhances the structural integrity of the filter assembly 50. The bottom end cap 122 also includes four T-shaped sockets 128 spaced approximately 90° apart in an axially symmetric arrangement along the periphery of the side wall 124.

The versatility of the modular filter cartridges is enhanced by the male/female hydraulic interconnection between filter cartridges which can readily be plugged and unplugged from one another to create various filter assembly configurations or replace filter cartridges in existing units. However, the hydraulic connections between filter cartridges generally are not sufficient by themselves to provide the proper structural integrity required of a filter assembly subjected to internal fluid pressure and other external forces. As illustrated in FIG. 2, the individual filter cartridges are mechanically secured to each other using a center clip 130 and a plurality of side clips 132. The center clip 130 mechanically interconnects four filter cartridges when arranged in a U-shaped or square pattern. Each side clip 132 mechanically interconnects adjacent filter cartridges along the outer perimeter of the filter assembly. Preferably, the top end caps and bottom end caps of each filter cartridge are mechanically interconnected with a center clip 130 and four side clips 132 at the top and bottom of the filter cartridges. It is to be appreciated, however, that the filter cartridges may be mechanically interconnected at either the top or bottom end caps of the filter cartridges, and that either the center clip 130, the side clips 132 or a combination of side clips and center clips could be eliminated while still maintaining the structural integrity of a filter assembly.

Figure 9:
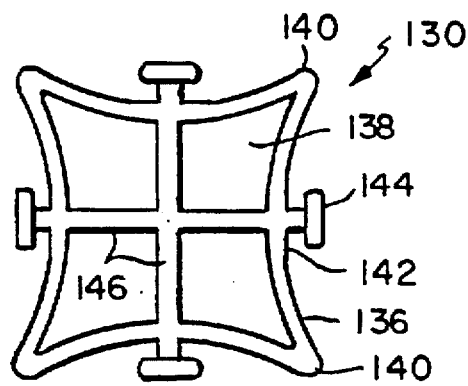
FIG. 9 is a top plan view of an illustrative embodiment of a center clip of the present invention.
Figure 10:
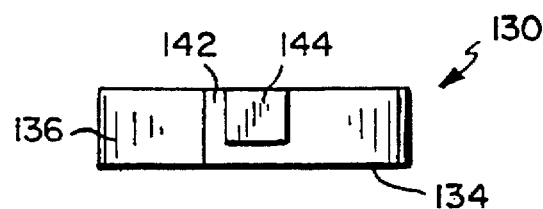
FIG. 10 is a side elevational view of the center clip shown in FIG. 9.
Figure 11:
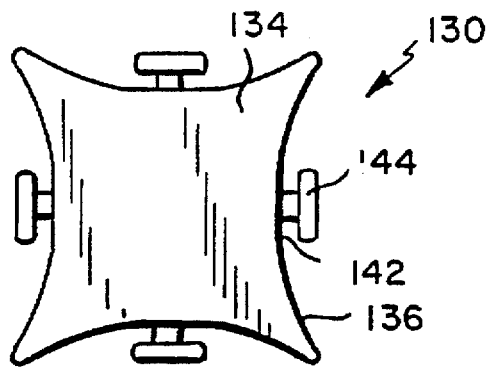
FIG. 11 is a bottom plan view of the center clip shown in FIG. 9.

A preferred embodiment of the center clip 130 is illustrated in FIGS. 9–11. The center clip 130 is a generally square member including a planar wall 134 and four side walls 136 protruding from the perimeter of the planar wall 134 in a normal direction to form a cavity 138 in the center clip. Each side wall 136 has a generally concave shape that curves from opposite corners 140 of the side wall 136 inwardly toward the cavity 138 to substantially conform to the exterior shape of an end cap. Each side wall 136 has a planar portion 142 centrally located between each corner 140 which is adapted to engage a corresponding planar portion 86, 126 on the top and bottom end caps of the filter cartridges as described above. The center clip 130 also includes a T-shaped locking tab 144 protruding outwardly from the planar portion 142 of each side wall 136. The locking tabs 144 are configured to engage the sockets 88, 128 in the top and bottom end caps and mechanically interconnect the filter cartridges to each other. The side walls 136 of the center clip are interconnected by ribbed walls 146 disposed within the cavity 138 to reinforce and minimize the deflection of the side walls to ensure a tight mechanical connection between cartridges.

Figure 12:
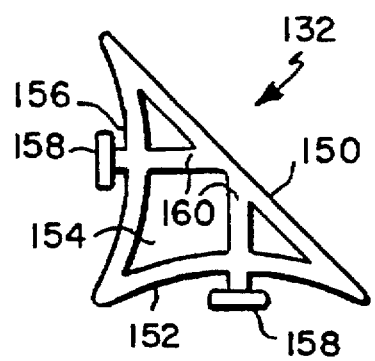
FIG. 12 is a top plan view of an illustrative embodiment of a side clip of the present invention.
Figure 13:
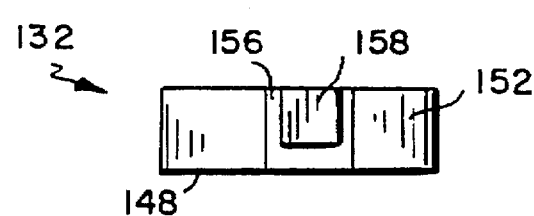
FIG. 13 is a side elevational view of the side clip shown in FIG. 12.
Figure 14:
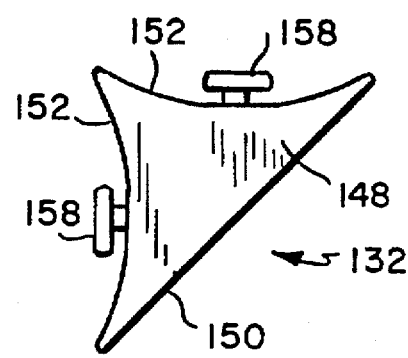
FIG. 14 is a bottom plan view of the side clip shown in FIG. 12.

A preferred embodiment of the side clip 132 is illustrated in FIGS. 12–14. The side clip is a generally triangular-shaped member including a planar wall 148 with an outer wall 150 and two inner side walls 152 protruding from the perimeter of the planar wall 148 in a normal direction to form a cavity 154 in the side clip. The inner side walls 152 have a generally concave shape that conforms with the exterior shape of the end caps. Each inner side wall also has a planar portion 156 to engage a corresponding planar portion 86, 126 on the top and bottom end caps of a filter cartridge. Similar to the center clip described above, the side clip 132 includes a T-shaped locking tab 158 protruding outwardly from the planar portion 156 of each inner side wall 152. Each T-shaped locking tab 158 engages a corresponding socket 88, 128 on the top and bottom end caps to mechanically interconnect the filter cartridges. It is to be appreciated that other embodiments for clips that can interconnect filter cartridges can be utilized and that such embodiments are intended to be within the scope of this invention. Several of these illustrative embodiments are described below.

Figure 15:
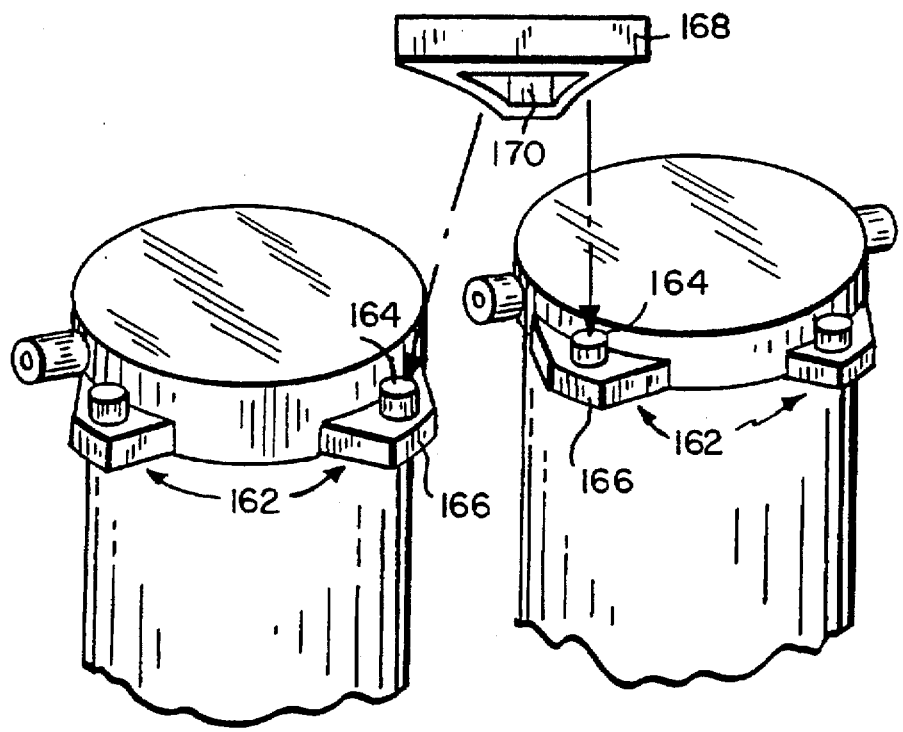
FIG. 15 is a partial perspective view of an illustrative embodiment of a side clip and a post and socket arrangement.

FIG. 15 illustrates an embodiment of an interconnecting scheme using a pin and socket arrangement. A plurality of pin connectors 162 are symmetrically disposed along the periphery of each end cap. Each pin connector 162 includes a pin 164 attached to and protruding in a normal direction from an upper surface of a base 166 of the connector. When the filter cartridges are hydraulically connected to each other, a connector clip 168 is pressed onto adjacent pin connectors 162 to mechanically secure the filter cartridges. The connector clip 168 has a downwardly-facing cavity 170 that is configured so that to receive adjacent pins 164 and draw the filter cartridges into intimate hydraulic and mechanical contact. The cavity 170 is configured so that an interference fit is created between the connector clip 168 and pin connectors 162 that is sufficient to produce a tight mechanical fit.

Figure 16:
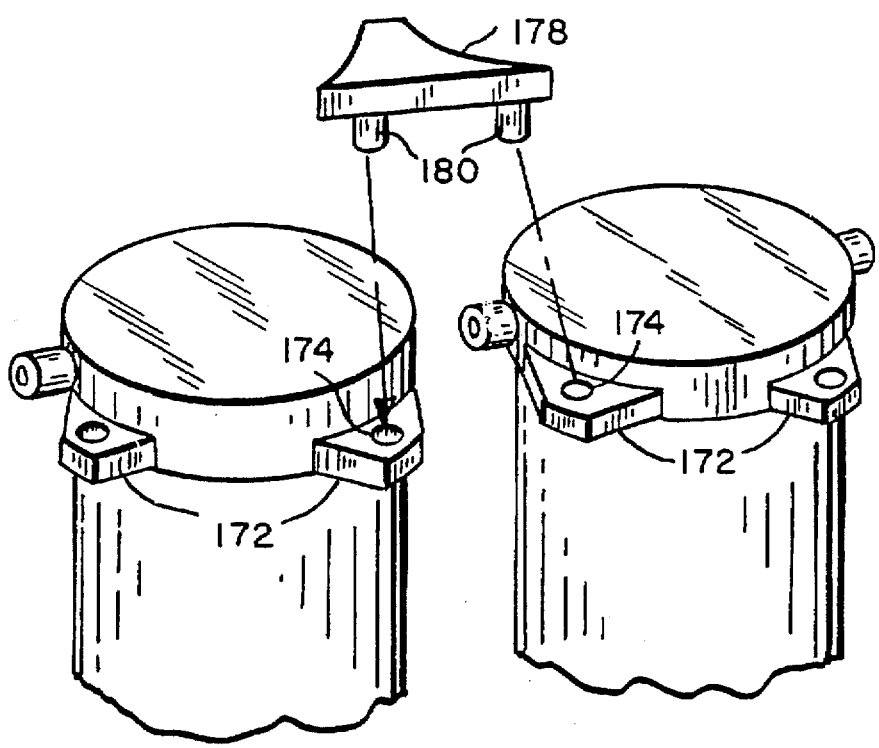
FIG. 16 is a partial perspective view of another illustrative embodiment of a side clip and a pin and socket arrangement.

FIG. 16 is another illustrative embodiment for interconnecting filter cartridges using a pin and socket arrangement. In this embodiment, a plurality of socket connectors 172 are symmetrically disposed on the periphery of each end cap of a filter cartridge. Each socket connector 172 has a hole 174 extending in a vertical direction through the body of the socket connector. When adjacent filter cartridges are hydraulically connected to each other, a pin connector clip 178 is attached to adjacent socket connectors 172 to mechanically secure the filter cartridges. The connector clip 178 includes at least two pins 180 protruding downwardly from the body of the connector clip 178 which are arranged to be inserted into the holes 174 in adjacent socket connectors 172 to draw together and mechanically secure the filter cartridges.

FIG. 17 illustrates a further embodiment for mechanically securing adjacent filter cartridges to each other using a dovetail clip and socket arrangement. A plurality of dovetail sockets 182 are symmetrically disposed along the periphery of each end cap of a filter cartridge in a manner similar to the T-shaped sockets described above. When the filter cartridges are hydraulically connected to each other, a connector clip 184 is used to mechanically secure the filter cartridges to each other. Each connector clip 184 includes dovetail locking tabs 186 protruding from concave side walls of the connector clip body which are arranged to mate with the dovetail sockets 182 on the filter cartridge end caps.

Preferably, the end caps and connector clips described above are molded in a manner generally known in the art (e.g., injection molding) from a plastic material (e.g., polypropylene). It is to be appreciated, however, that other materials and processes may be used.

Although filter cartridges are preferably secured to each other by interconnecting the end caps of adjacent cartridges, it is to be appreciated that filter cartridges could also be mechanically secured to each other using a connector clip that mechanically secures the tubes of adjacent filter cartridges to each other instead of or in addition to the end caps. FIG. 18 illustrates an embodiment of a connector clip arranged to mechanically secure the tubes of two filter cartridges to each other. The tube connector clip 188 includes a pair of opposing concave end walls 190 extending inwardly toward each other to form opposing U-shaped clips integrally connected to each other by a central web portion 192. The concave end wall 190 defining each U-shaped clip should substantially conform to the shape of a filter cartridge tube so that the tube can be snapped into the tube connector clip 188. The tips 194 of the connector clip 188 should be configured to provide a positive gripping force to a tube when it is snapped into the connector clip that is sufficient to ensure that the tubes are mechanically secured to each other.

FIG. 19 is another illustrative embodiment of a tube clip arranged to mechanically interlock the tubes of four filter cartridges arranged in a U-shaped or square configuration. The connector clip 196 in this embodiment has a cross shape defined by four concave walls 198 that form four generally U-shaped clips into which a filter cartridge tube can be snapped.

As can be appreciated from the foregoing descriptions, individual filter cartridges can be interconnected using various end cap configurations and connector clips to assemble filter assemblies into desired configurations. Other illustrative embodiments of filter assemblies described below demonstrate the flexibility provided by the modular filter cartridges.

Figure 20:
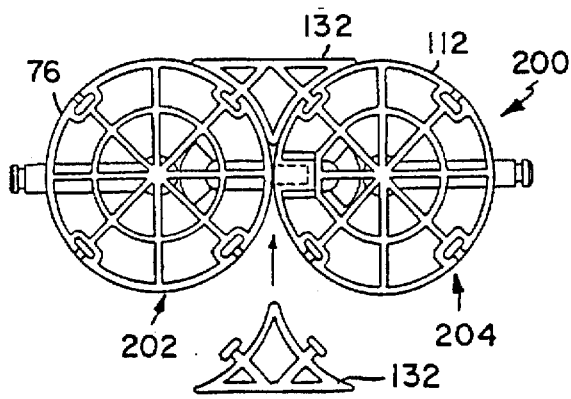
FIG. 20 is a top plan view of an illustrative embodiment of two filter cartridges arranged in a linear configuration.

FIG. 20 is a top view of an illustrative embodiment of a filter assembly 200 including two filter cartridges hydraulically connected in a linear configuration in which the filter assembly inlet and outlet ports are axially aligned. The first filter cartridge 202 includes a straight male-to-male top end cap 76 and the second filter cartridge 204 includes a straight female-to-male top end cap 112. The filter cartridges are mechanically secured to each other using a pair of side clips 132 to interconnect the top and bottom end caps of the filter cartridges.

Figure 21:
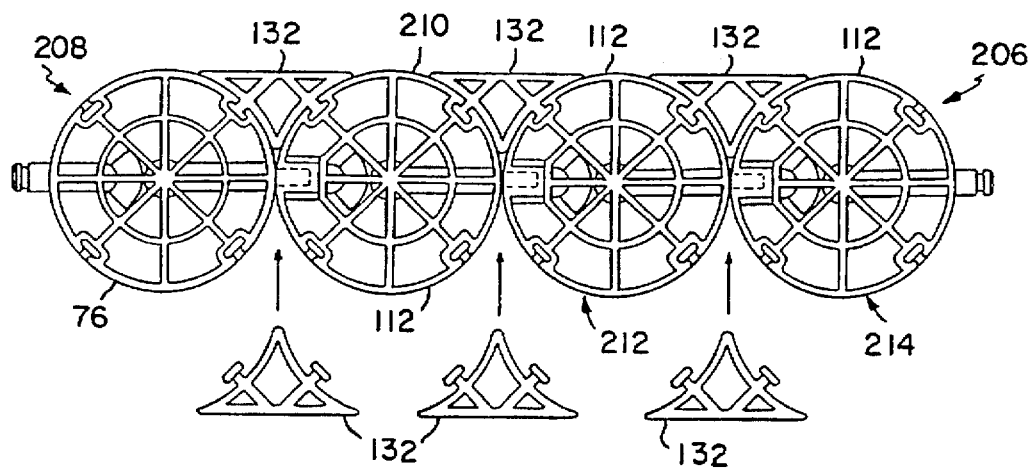
FIG. 21 is a top plan view of a further illustrative embodiment of four filter cartridges arranged in a linear configuration.

FIG. 21 is another illustrative embodiment of a filter assembly 206 including four filter cartridges hydraulically connected in a linear configuration. In this embodiment, the first filter cartridge 208 uses a straight male-to-male top end cap 76, and each of the second, third and fourth filter cartridges 210, 212, 214 uses a straight female-to-male top end cap 112. Each filter cartridge is mechanically secured to an adjacent filter cartridge using a pair of side clips 132 to interconnect the top and bottom end caps of adjacent filter cartridges.

Figure 22:
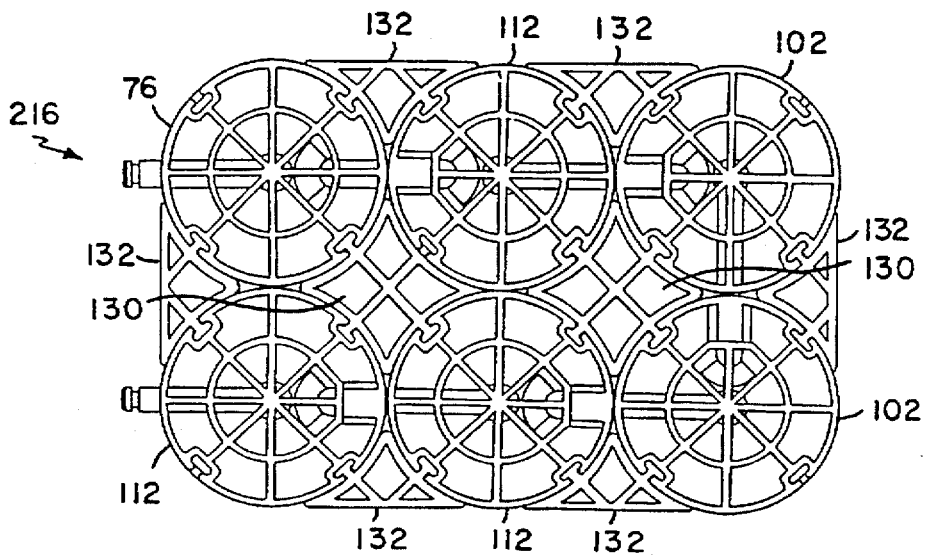
FIG. 22 is a top plan view of still another illustrative embodiment of six filter cartridges arranged in a U-shaped configuration.

FIG. 22 is a further illustrative embodiment of a filter assembly 216 including six filter cartridges hydraulically connected in a U-shaped configuration. As described above for FIG. 2, each of the filter cartridges is hydraulically connected using separate top end caps having particular inlet and outlet port configurations resulting in a fluid flow circuit that is turned 180°. In particular, this embodiment uses a combination of top end caps that includes a straight male-to-male top end cap 76, a plurality of straight female-to-male end caps 112 and a plurality of angled female-to-male 102 top end caps. Furthermore, the filter cartridges are mechanically secured to each other using a combination of center clips 130 and side clips 132 to interconnect adjacent top and bottom end caps to each other.

Having described several illustrative embodiments of the invention, various alterations, modifications, and improvements will readily occur to those skilled in the art. Such alternations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A modular filtering system comprising:
   a first filter cartridge including an inlet port and an outlet port;
   a second filter cartridge including an inlet port and an outlet port, the inlet port of the second filter cartridge being hydraulically connected to the outlet port of the first filter cartridge; and
   a connector clip connected to the first filter cartridge and the second filter cartridge to mechanically secure the first filter cartridge to the second filter cartridge,
   wherein the first filter cartridge and the second filter cartridge each include a filter tube, a first end cap attached to one end of the filter tube and a second end cap attached to an opposite end of the filter tube, and the connector clip includes a concave side wall adapted to substantially conform to the side walls of the first and second end caps.

2. The modular filtering system recited in claim 1, wherein the connector clip is connected to the first end caps of the first and second filter cartridges.

3. The modular filtering system recited in claim 2, wherein the connector clip includes a pair of connector clip portions connected to the first end caps of the first and second filter cartridges.

4. The modular filtering system recited in claim 1, wherein the connector clip includes a first connector clip portion and a second connector clip portion, the first connector clip portion being connected to the first end caps of the first and second filter cartridges, the second connector clip portion being connected to the second end caps of the first and second filter cartridges.

5. The modular filtering system recited in claim 4, wherein the first connector clip includes a first pair of connector clip portions and the second connector clip includes a second pair of connector clip portions.

6. The modular filtering system recited in claim 1, wherein the connector clip includes a locking tab, and one of the first end cap and the second end cap includes a socket connector adapted to receive the locking tab.

7. The modular filtering system recited in claim 6, wherein the locking tab and the socket connector are T-shaped.

8. The modular filtering system recited in claim 1, wherein the outlet port of the first filter cartridge is a male connector and the inlet port of the second filter cartridge is a female socket connector, the outlet port of the first filter cartridge being inserted into the inlet port of the second filter cartridge.

9. The modular filtering system recited in claim 1, wherein each of the first and second end caps includes a substantially circular side wall and a plurality of planar portions disposed on the side wall.

10. The modular filtering system recited in claim 9, wherein the planar portions are arranged in an axially symmetric pattern.

11. The modular filtering system recited in claim 10, wherein the inlet and outlet ports of the first and second filter cartridges are each disposed on one of the plurality of planar portions.

12. The modular filtering system recited in claim 9, wherein the concave side wall of the connector clip includes a planar portion adapted to engage one of the plurality of planar portions on the first and second end caps.

13. The modular filtering system recited in claim 12, wherein the connector clip includes a locking tab protruding from the planar portion and the first and second end caps include a socket connector adjacent one of the plurality of planar portions, the locking tab being inserted into the socket connector.

14. A modular filtering system comprising:
   a first filter cartridge including an inlet port and an outlet port;
   a second filter cartridge including an inlet port and an outlet port, the inlet port of the second filter cartridge being hydraulically connected to the outlet port of the first filter cartridge; and
   a connector clip connected to the first filter cartridge and the second filter cartridge to mechanically secure the first filter cartridge to the second filter cartridge,
   wherein the first filter cartridge and the second filter cartridge each include a filter tube, a first end cap attached to one end of the filter tube and a second end cap attached to an opposite end of the filter tube, and the connector clip includes a concave side wall adapted to substantially conform to the side walls of the filter tubes of the first and second filter cartridges.

15. The modular filtering system recited in claim 14, wherein each of the first and second end caps includes a substantially circular side wall and a plurality of planar portions disposed on the side wall.

16. The modular filtering system recited in claim 15, wherein the planar portions are arranged in an axially symmetric pattern.

17. The modular filtering system recited in claim 16, wherein the inlet and outlet ports of the first and second filter cartridges are each disposed on one of the plurality of planar portions.

* * * * *